United States Patent
Isogami et al.

(10) Patent No.: US 8,562,829 B2
(45) Date of Patent: Oct. 22, 2013

(54) MAGNETIC SEPARATION APPARATUS AND WASTE WATER TREATMENT APPARATUS

(75) Inventors: Hisashi Isogami, Tokyo (JP); Satoshi Miyabayashi, Tokyo (JP); Minoru Morita, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 353 days.

(21) Appl. No.: 13/040,473

(22) Filed: Mar. 4, 2011

(65) Prior Publication Data
US 2011/0215041 A1 Sep. 8, 2011

(30) Foreign Application Priority Data
Mar. 5, 2010 (JP) ................................. 2010-049216

(51) Int. Cl.
| B01D 35/06 | (2006.01) |
| B03C 1/02 | (2006.01) |
| B03C 1/30 | (2006.01) |
| C02F 1/48 | (2006.01) |
| C02F 1/52 | (2006.01) |

(52) U.S. Cl.
USPC ........... 210/222; 210/202; 210/223; 210/259; 210/396; 210/402; 209/219; 209/223.2; 209/229

(58) Field of Classification Search
USPC ................. 210/202, 222, 223, 259, 396, 402; 209/219, 223.2, 229
See application file for complete search history.

(56) References Cited

U.S. PATENT DOCUMENTS

| 4,686,035 A * | 8/1987 | Estabrook ..................... 210/222 |
| 5,944,986 A * | 8/1999 | Saho et al. .................... 210/259 |
| 7,927,489 B2 * | 4/2011 | Tashiro ......................... 210/222 |
| 2007/0187302 A1 * | 8/2007 | Parra Huerta ................. 210/222 |

FOREIGN PATENT DOCUMENTS

| CA | 2 640 019 A1 | 4/2009 |
| CN | 2651237 Y | 10/2004 |
| EP | 1676818 A1 * | 7/2006 |

(Continued)

OTHER PUBLICATIONS

Letter of Mr. Hu dated Mar. 9, 2012 in English submitted to the Canadian Intellectual Property Office.

(Continued)

*Primary Examiner* — David A Reifsnyder
(74) *Attorney, Agent, or Firm* — Antonelli, Terry, Stout & Kraus, LLP.

(57) ABSTRACT

A magnetic separation apparatus comprising: a separation vessel into which waste water containing a coagulated magnetic floc is supplied; a drum separator that is provided in the separation vessel and adsorbs the magnetic floc with a magnetic force while being rotated; a scraper that is abutted against a surface of the separator and scrapes the magnetic floc adsorbed by the surface of the separator; a scraper guide that is connected to the scraper and discharges the magnetic floc scraped by the scraper; and a scraping brush that scrapes the magnetic floc scraped by the scraper from the scraper and guides the magnetic floc to the scraper guide, wherein a lower portion of the separator is submerged in the waste water in the separation vessel, a rotational direction of the separation vessel in the waste water is set to the same direction as a flow direction of the waste water flowing in the separator, and a rotational direction of the scraping brush is set to a direction opposite to the rotational direction of the separator.

7 Claims, 8 Drawing Sheets

(56) References Cited

FOREIGN PATENT DOCUMENTS

| JP | 07-303810 A | 11/1995 |
| JP | 09-001176 A | 1/1997 |
| JP | 2001-276745 A | 10/2001 |
| JP | 2003-220351 A | 8/2003 |
| JP | 2005-131479 | 5/2005 |
| JP | 2009-101339 | 5/2009 |
| JP | 2009-112978 | 5/2009 |
| WO | WO 2009/044719 A1 | 4/2009 |
| WO | WO 2009/060813 A1 | 5/2009 |

OTHER PUBLICATIONS

Office Action of JP Appln. No. 2010-049216 dated Jul. 25, 2013 with partial English translation.

* cited by examiner

MAGNETIC SEPARATION APPARATUS AND WASTE WATER TREATMENT APPARATUS

BACKGROUND OF THE INVENTION

1. Field of the Invention

The present invention relates to a magnetic separation apparatus and a waste water treatment apparatus, and more particularly to a magnetic separation apparatus and a waste water treatment apparatus that separates suspended solid, oil, or heavy metal from waste water containing suspended solid, oil, or heavy metal and obtains treated water.

2. Description of the Related Art

As an apparatus that separates suspended solid, oil, or heavy metal from waste water containing suspended solid, oil, or heavy metal, a waste water treatment apparatus using a magnetic separation apparatus has been conventionally known. The waste water treatment apparatus adds magnetic powder to waste water when coagulating and treating suspended solid, oil, or heavy metal contained in waste water, separates a coagulated floc (hereinafter referred to as a magnetic floc) containing magnetic powder with a magnetic force of the magnetic separation apparatus, and thus obtains treated water.

FIG. 6 is a block diagram showing a configuration of a waste water treatment apparatus 100 disclosed in Japanese Patent Application Laid-Open No. 2009-112978.

With the waste water treatment apparatus 100, waste water is mixed with magnetic powder (for example, ferrosoferric oxide) and an inorganic coagulant (for example, ferric chloride, polyaluminum chloride) in a rapid agitation vessel 102, and then mixed with a high molecular coagulant in a slow agitation vessel 104. A magnetic floc generated in the rapid agitation vessel 102 and the slow agitation vessel 104 takes in suspended solid, oil, or heavy metal in the waste water, and thus waste water is purified. The magnetic floc is separated by a floc separation device 106 provided in a subsequent stage of the slow agitation vessel 104. The floc separation device 106 includes a magnetic separation apparatus 108 and a filter 110. The waste water from which the magnetic floc is separated is treated water. The magnetic floc that has not been separated by the magnetic separation apparatus 108 is separated and removed by the filter 110 in a subsequent stage, and returned to the magnetic separation apparatus 108 and separated.

However, the waste water treatment apparatus 100 in Japanese Patent Application Laid-Open No. 2009-112978 can obtain clean treated water by providing the magnetic separation apparatus 108 and the filter 110 in line, but in order to prevent the filter 110 from being clogged, the filter 110 needs continuous back washing that requires a large filtering area. Specifically, the waste water treatment apparatus 100 in Japanese Patent Application Laid-Open No. 2009-112978 has an advantage that the magnetic separation apparatus 108 is used instead of a settling basin to significantly reduce an installation area, but requires a large filter 110, which loses an advantage of the magnetic separation apparatus 108.

A structure of a disk-type magnetic separation apparatus 120 disclosed in Japanese Patent Application Laid-Open No. 2009-101339 is shown in FIGS. 7 and 8. FIG. 7 is a plan view of the magnetic separation apparatus 120, and FIG. 8 is a front view of the magnetic separation apparatus 120, and a perspective view illustrating a separation vessel 122 having a semicircular section.

In the separation vessel 122 of the magnetic separation apparatus 120, disks 124 and 126 having a magnetic force are placed at a predetermined interval. A shaft 128 is secured to centers of the disks 124 and 126, and the shaft 128 is connected to an unshown motor. The motor rotates the disks 124 and 126 counterclockwise in FIG. 8 via the shaft 128. Height positions of the disks 124 and 126 are set so that when waste water flows into the separation vessel 122, lower halves of the disks 124 and 126 are submerged in the waste water.

A waste water supply portion 130 is provided in a center of a bottom of the separation vessel 122. Thus, coagulated waste water flows from the supply portion 130 into the separation vessel 122 as an upward flow, and is divided into two directions with the supply portion 130 at the middle. While the waste water is flowing toward treated water discharge ports 132 and 134 provided on opposite sides in an upper portion of the separation vessel 122, a magnetic floc in the waste water adheres to the disks 124 and 126. The magnetic floc adhering to the disks 124 and 126 is scraped by a scraper 136 provided between the disks 124 and 126 during rotation of the disks 124 and 126. The scraped magnetic floc is scraped by a sludge scraper 138 provided along the scraper 136 and discharged to the outside of the magnetic separation apparatus 120.

In the magnetic separation apparatus 120, there is a region in which a water flow direction in the separation vessel 122 is opposite to a rotational direction of the disks 124 and 126 (left portion viewed from the shaft 128 in FIG. 8). In this region, a force to release the magnetic floc adhering to the disks 124 and 126 is significantly applied to the magnetic floc by a flow of the waste water, which may slightly reduce quality of treated water. Thus, the magnetic separation apparatus 120 in Japanese Patent Application Laid-Open No. 2009-101339 requires a filter in a subsequent stage of the treated water discharge port 134.

A magnetic separation apparatus disclosed in Japanese Patent Application Laid-Open No. 2005-131479 has a structure in which a magnetic floc generated by a coagulation device is once filtered by a rotary filter, and the magnetic floc on a surface of the rotary filter is adsorbed by a drum separator (magnetic drum) and scraped by a scraper.

The separator includes a magnet rotor including a group of magnets and a drum rotor that constitutes a surface of the magnetic drum, and the magnet rotor and the drum rotor may be integrally or separately rotatable. When an outer diameter of the magnet rotor is substantially the same as an inner diameter of the drum rotor, sludge or a transfer blade is provided near a position where the scraper that scrapes the magnetic floc is in contact with the drum rotor to facilitate discharge of the magnetic floc.

In the conventional waste water treatment apparatuses using a magnetic force as in Japanese Patent Application Laid-Open Nos. 2009-112978 and 2009-101339, a large filter is required in a subsequent stage of a magnetic separation apparatus in order to obtain clean treated water, which loses an advantage of the magnetic separation apparatus that an installation area can be reduced.

In the invention in Japanese Patent Application Laid-Open No. 2005-131479, a large rotary filter that determines treated water quality performance needs to be provided, and there is a defect such as clogging depending on waste water quality. Thus, an apparatus can be supposed that has a configuration only including a separator with a rotary filter removed from the structure in Japanese Patent Application Laid-Open No. 2005-131479, and adsorbs and separates a magnetic floc.

However, with the configuration only including the separator, a shear force is generated due to a difference between a circumferential velocity by rotation of the separator and a flow velocity of the waste water. Thus, if an rpm of the separator is increased to increase the number of discharged magnetic flocs particularly when raw water having high concentration is treated, a large shear force is generated between the separator and the magnetic floc. Since the magnetic floc adsorbed by the separator is very fragile, the magnetic floc is divided into fine flocs when the shear force is generated, and magnetic separation performance is degraded. Also, a shear force due to a difference between the magnetic force and a fluid force degrades the magnetic separation performance.

SUMMARY OF THE INVENTION

The present invention is achieved in view of such circumstances, and has an object to provide a magnetic separation apparatus and a waste water treatment apparatus that can efficiently collect a magnetic floc and efficiently obtain clean treated water using a simple apparatus only including a magnetic separation apparatus without using a filter.

In order to achieve the object, the present invention provides a magnetic separation apparatus including: a separation vessel into which waste water containing a coagulated magnetic floc is supplied; a drum separator that is provided in the separation vessel and adsorbs the magnetic floc with a magnetic force while being rotated; a scraper that is abutted against a surface of the separator and scrapes the magnetic floc adsorbed by the surface of the separator; a scraper guide that is connected to the scraper and discharges the magnetic floc scraped by the scraper; and a scraping brush that scrapes the magnetic floc scraped by the scraper from the scraper and guides the magnetic floc to the scraper guide, wherein a lower portion of the separator is submerged in the waste water in the separation vessel, a rotational direction of the separation vessel in the waste water is set to the same direction as a flow direction of the waste water flowing in the separation vessel, and a rotational direction of the scraping brush is set to a direction opposite to the rotational direction of the separator.

Disadvantages of conventional magnetic separation apparatuses occur because there is a portion in which a flow direction of waste water in a separation vessel is opposite to a rotational direction of a separator.

To eliminate the disadvantages, in the present invention, the flow direction of the waste water in the separation vessel is the same as the rotational direction of the rotating drum separator. This significantly reduces a force to release the magnetic floc adhering to the separator, and thus significantly increases collection efficiency of the magnetic floc by the separator. This advantage eliminates the need for a filter that has been conventionally required, thereby reducing installation space of the magnetic separation apparatus.

Also, in the present invention, a circumferential velocity of the surface of the separator is substantially the same as a flow velocity of the waste water, thereby minimizing a shear force due to a difference in velocity. The magnetic floc adsorbed by the surface of the separator with a magnetic force passes through the waste water with rotation of the separator, and is lifted into the air. At this time, water accompanying the magnetic floc falls by gravity, thereby reducing a water content of the collected magnetic floc and increasing concentration of the collected magnetic floc. Since a group of magnets of the separator are also rotated with the rotation of the separator, the magnetic floc lifted into the air always receives a sufficient magnetic force. This prevents the magnetic floc from slipping off the surface of the separator.

As such, the magnetic floc lifted into the air and moved with the rotation of the separator is scraped from the surface of the separator by the scraper. However, in the separator in which the group of magnets are provided near the surface of the separator, the magnetic floc scraped by the scraper is accumulated in a position where the magnetic floc is scraped by the scraper, that is, in a position where the scraper is in contact with the surface of the separator by a strong magnetic force of the group of magnets, and is hard to discharge via the scraper guide. Thus, in the present invention, the rotating scraping brush is provided in the position where the surface of the separator is in contact with the scraper. The scraping brush is rotated in the direction opposite to the rotational direction of the separator, and thus the magnetic floc scraped by the scraper can be forcibly conveyed from the scraper to the scraper guide, and can be discharged by gravity when slipping down along the scraper guide.

As described above, the magnetic separation apparatus of the present invention can efficiently collect a magnetic floc and efficiently obtain clean treated water using a simple apparatus only including the magnetic separation apparatus without using a filter.

In the magnetic separation apparatus of the present invention, it is preferable that the separation vessel has a semicircular section, the waste water supply portion is provided at one end of opposite ends in an upper portion of the separation vessel, on an upstream side in the rotational direction of the separator, and a treated water discharge portion is provided at the other end of the opposite ends in the upper portion, on a downstream side in the rotational direction of the separator.

The present invention shows one aspect of the magnetic separation apparatus. Specifically, the separation vessel has the semicircular section, the waste water is supplied to the separator from one end of the opposite ends in the upper portion, on the upstream side in the rotational direction of the separator, and treated water is discharged from the other end of the opposite ends in the upper portion, on the downstream side in the rotational direction of the separator. This allows the flow direction of the waste water in the separation vessel to be the same as the rotational direction of the rotating separator with a simple structure.

In the magnetic separation apparatus of the present invention, a maximum circumferential velocity of the separator is preferably set to be substantially the same as a flow velocity of the waste water in the separation vessel.

The magnetic floc adsorbed by the separator is significantly influenced by the gravity when lifted from a waste water surface by the rotation of the separator and separated from the water, and is about to be separated from the separator. Then, the maximum circumferential velocity of the separator is set to be substantially the same as the flow velocity of the waste water in the separation vessel. Thus, when the magnetic floc is about to be separated from the water, a force to press the magnetic floc upward together with the separator is applied to the magnetic flock by a flow force of the waste water. This can prevent the magnetic floc from being released from the separator, thereby further increasing collection efficiency of the magnetic floc.

In the magnetic separation apparatus of the present invention, it is preferable that a plurality of separators are placed in series in the flow direction of the waste water, a rotational direction of a separator on an upstream side is set to be the same as the flow direction of the waste water, and a rotational direction of a separator on a downstream side is set to a direction opposite to the flow direction of the waste water.

In the magnetic separation apparatus of the present invention, the separator on the downstream side is preferably smaller than the separator on the upstream side.

In the magnetic separation apparatus of the present invention, a height of a weir of a channel connecting the separator on the upstream side and the separator on the downstream side is preferably set to be lower than a water level of the waste water.

In order to achieve the object, the present invention provides a waste water treatment apparatus including: a raw water tank that stores waste water; a rapid agitation vessel to which the waste water is supplied from the raw water tank and that mixes the waste water, magnetic powder, and an inorganic coagulant; a slow agitation vessel to which the waste water mixed by the rapid agitation vessel is supplied and that mixes the waste water and a high molecular coagulant to generate a magnetic floc in the waste water; and a magnetic separation apparatus of the present invention to which the waste water mixed by the slow agitation vessel is supplied and that separates the magnetic floc in the waste water from the waste water.

The separator is not limited to the drum separator, but may be a separator such that an outer periphery thereof draws a circular locus when rotated.

As described above, the magnetic separation apparatus and the waste water treatment apparatus can efficiently collect a magnetic floc and efficiently obtain clean treated water using only the magnetic separation apparatus without using a filter.

DETAILED DESCRIPTION OF THE PREFERRED EMBODIMENTS

Now, a preferred embodiment of a magnetic separation apparatus and a waste water treatment apparatus according to the present invention will be described with reference to the accompanying drawings.

Figure 1:
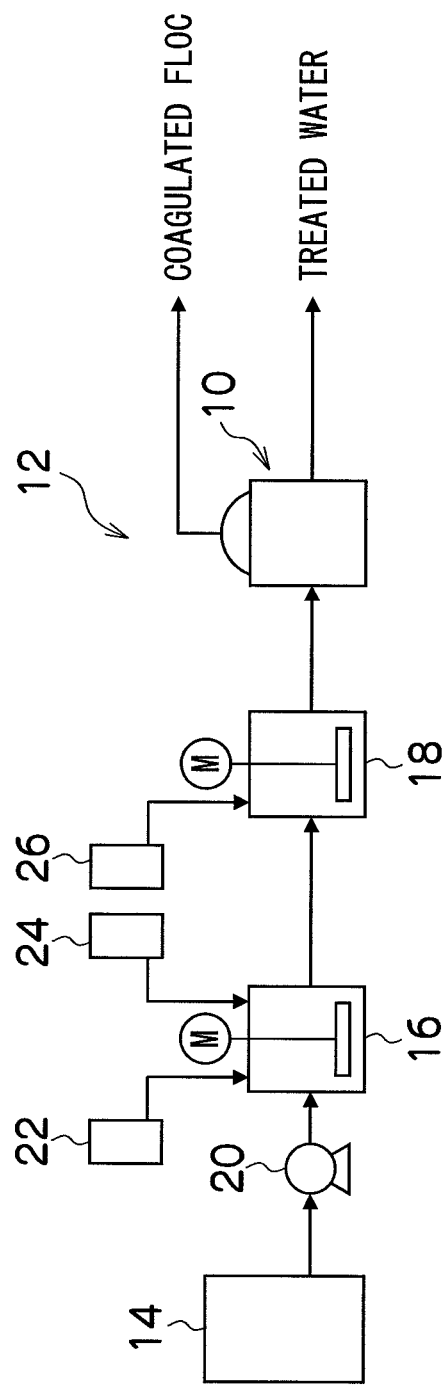
FIG. 1 is a block diagram showing a structure of a waste water treatment apparatus to which a magnetic separation apparatus of an embodiment is applied.

FIG. 1 is a block diagram showing a structure of a waste water treatment apparatus 12 to which a magnetic separation apparatus 10 of the embodiment is applied.

The waste water treatment apparatus 12 includes a raw water tank 14, a rapid agitation vessel 16, a slow agitation vessel 18, and the magnetic separation apparatus 10 placed from an upstream side to a downstream side of a waste water treatment system.

Waste water (waste water containing suspended solid, oil, or heavy metal) as water to be treated is first fed from the raw water tank 14 to the rapid agitation vessel 16 by a raw water pump 20. Then, in the rapid agitation vessel 16, an inorganic coagulant, for example, PAC (polyaluminum chloride), ferric sulfate, ferric chloride, or aluminum sulfate is added from an inorganic coagulant vessel 22 by an inorganic coagulant injection pump (not shown), and rapidly agitated. The rapid agitation increases frequency of collision of suspended substances or oil particles, and multiple minute flocs called microflocs are formed by an effect of the coagulant. Then, in the rapid agitation vessel 16 or just outside the rapid agitation vessel 16, magnetic powder such as magnetite is added from a magnetic powder vessel 24 to the waste water by a magnetic powder injection pump (not shown). The waste water containing the magnetic powder and the microflocs flows out of the rapid agitation vessel 16 and then flows into the slow agitation vessel 18. High molecular polymer (high molecular coagulant) is injected from a high molecular polymer tank 26 into the slow agitation vessel 18 by a pump (not shown), and slowly agitated in the slow agitation vessel 18 to grow a magnetic floc. The high molecular polymer in this case is desirably anionic polymer, and for example, polyacrylamide is suitable. For polyacrylamide, a structure can be supposed in which polyacrylamide is stored in powder form, injected in a fixed quantity into the high molecular polymer tank 26 by a feeder and agitated. In the above example, the inorganic coagulant and the anionic high molecular polymer are used, but the case of using only cationic high molecular polymer without using the inorganic coagulant also provides the advantage described below. The magnetic floc formed as described above is fed from the slow agitation vessel 18 to the magnetic separation apparatus 10, where the magnetic floc and treated water are separated. The above is the flow of waste water treatment by the waste water treatment apparatus 12.

Figure 2:
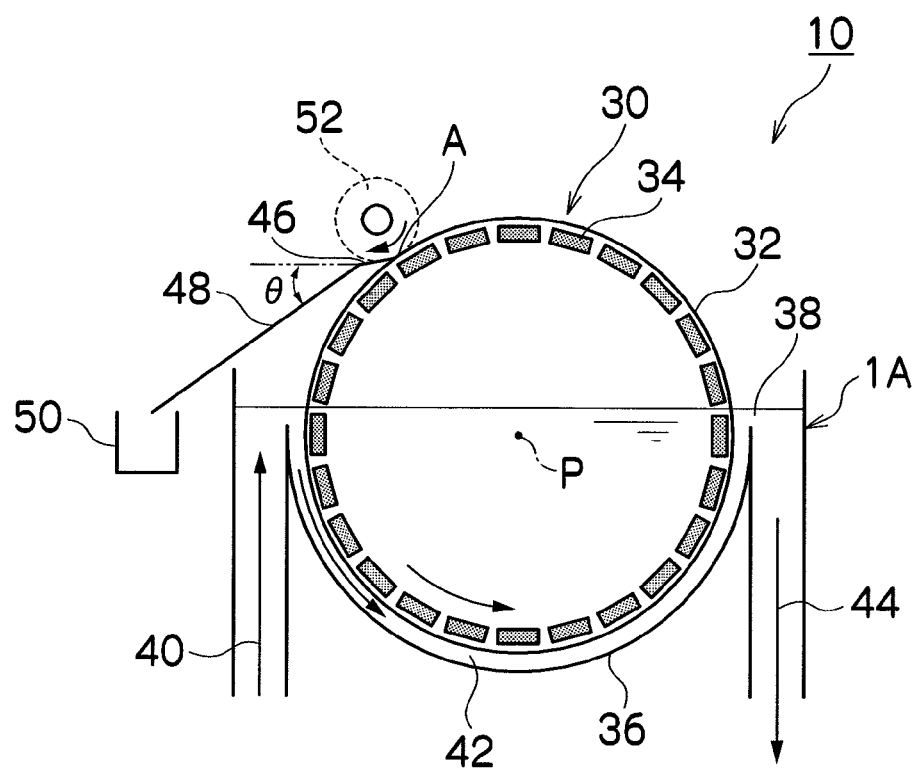
FIG. 2 is a side sectional view of a magnetic separation apparatus of a first embodiment.

FIG. 2 is a side sectional view of the magnetic separation apparatus 10 of a first embodiment.

The magnetic separation apparatus 10 includes a drum separator 30.

The separator 30 includes a drum rotor 32, and a group of magnets 34 constituted by multiple magnets placed along an inner peripheral surface of the drum rotor 32, and has a structure in which the drum rotor 32 and the group of magnets 34 can be integrally rotated around a center P. The separator 30 is placed in a separation vessel 36 having a semicircular section so that a lower half thereof is submerged in waste water 38. The drum rotor 32 may be made of metal or resin. Specifically, the drum rotor 32 may be made of a material that can apply a magnetic force of the group of magnets 34 to the magnetic floc.

The group of magnets 34 have a structure in which, for example, multiple neodymium magnets are attached, and are placed so that adjacent magnets have different polarity directions to increase a magnetic gradient near the group of magnets 34 and increase a magnetic force applied to a magnetic material near the group of magnets 34. The waste water 38 flows from a water channel inlet 40 provided in the separation vessel 36 into the separation vessel 36, and in a channel 42 in a lower portion of the separator 30, flows in the same direction as a counterclockwise rotational direction indicated by the arrow of the separator 30 and flows from a water channel exit 44 to the outside of the separation vessel 36. The magnetic floc in the waste water 38 is adsorbed by a surface of the drum rotor 32 with the magnetic force of the group of magnets 34 while passing through the channel 42. This removes an object to be removed in the waste water 38. The water channel inlet 40 is placed on an upstream side in the rotational direction of the separator 30, and the water channel exit 44 is placed on a downstream side in the rotational direction of the separator 30.

A circumferential velocity of the surface of the drum rotor 32 is set to be substantially the same as a flow velocity of the waste water flowing through the channel 42. This can minimize a shear force due to a difference in velocity (shear force applied between the surface of the drum rotor 32 and the magnetic floc adhering to the surface). The group of magnets 34 rotated integrally with the drum rotor 32 are moved at the same velocity, thereby also minimizing a shear force due to a difference between the magnetic force of the group of magnets 34 and a fluid force. Such an advantage of a reduction in shear force can prevent the magnetic floc adsorbed by the surface of the drum rotor 32 from being released from the drum rotor 32. The circumferential velocity of the surface of the drum rotor 32 and the flow velocity of the waste water 38 flowing through the channel 42 are desirably 0.05 to 0.2 m/s.

The separator 30 in the embodiment has a structure in which the drum rotor 32 and the group of magnets 34 are integrally rotated by the same drive source, but not limited to this. Specifically, a structure in which a drive shaft of the drum rotor 32 and a drive shaft of the group of magnets 34 are separately provided, and the drum rotor 32 and the group of magnets 34 are rotated by different drive sources substantially at the same velocity can obtain the same advantage.

The magnetic floc adsorbed by the surface of the drum rotor 32 with the magnetic force is lifted into the air from a liquid level of the waste water with rotation of the drum rotor 32. At this time, water accompanying the magnetic floc falls by gravity. This reduces a water content of the collected magnetic floc and increases concentration of the collected magnetic floc. Since the group of magnets 34 are rotated with rotation of the drum rotor 32, the magnetic floc lifted into the air always receives a sufficient magnetic force and does not slip off the surface of the drum rotor 32.

As such, the magnetic floc lifted into the air and moved with the rotation of the drum rotor 32 and the group of magnets 34 are scraped from the surface of the drum rotor 32 by a scraper 46 in contact with the surface of the drum rotor 32.

Meanwhile, in the separator 30 in the embodiment, the group of magnets 34 are placed along the inner peripheral surface of the drum rotor 32 and near the drum rotor 32. Thus, the magnetic floc is accumulated in a position (referred to as a scraper contact portion A) where the magnetic floc is scraped by the scraper 46 by a strong magnetic force of the group of magnets 34, and is hard to fall into a floc collection vessel 50 via a scraper guide 48 connected to the scraper 46.

Thus, in the separator 30 in the embodiment, a rotating scraping brush 52 is provided in the scraper contact portion A. The scraping brush 52 can be rotated in a direction opposite to the rotational direction of the separator 30 to forcibly convey the magnetic floc accumulated in the scraper contact portion A from the scraper 46 to the scraper guide 48. Thus, the magnetic floc slips down along the scraper guide 48, and is smoothly collected by the floc collection vessel 50.

If at least one of the drum rotor 32, the scraper 46, and the scraping brush 52 is made of resin, the member is easily deformed to facilitate contact between members. In particular, if a tip of the scraper 46 and the scraping brush 52 are made of resin, scraping efficiency of the magnetic floc is increased.

The circumferential velocity of the scraping brush 52 is set to be substantially the same as the circumferential velocity of the drum rotor 32, and thus the magnetic floc conveyed by the drum rotor 32 can be efficiently guided to the scraper guide 48 without being interfered by the scraping brush 52.

Further, in this structure, the water channel inlet 40 and the floc collection vessel 50 are placed on the same side with respect to the center P of the separator 30, and it is difficult to provide a large inclination angle (angle from a horizontal position) of the scraper guide 48. Without a large inclination angle of the scraper guide 48 being set, the magnetic floc guided to the scraper guide 48 does not slip down into the floc collection vessel 20 by gravity.

Thus, in the magnetic separation apparatus 10 of the embodiment, the scraper 46 and the scraper guide 48 have different inclination angles, and a horizontal distance of the scraper 46 is increased to increase the inclination angle θ of the scraper guide 48. The angle θ is desirably, for example, 45 degrees or more. At this time, it is important that the scraping brush 52 is sized to sufficiently sweep the scraper 46 so that the magnetic floc on the scraper 46 can be efficiently transferred.

Thus, the magnetic separation apparatus 10 of the embodiment can efficiently collect a magnetic floc and efficiently obtain clean treated water using a simple apparatus only including a magnetic separation apparatus without using a filter.

Figure 3:
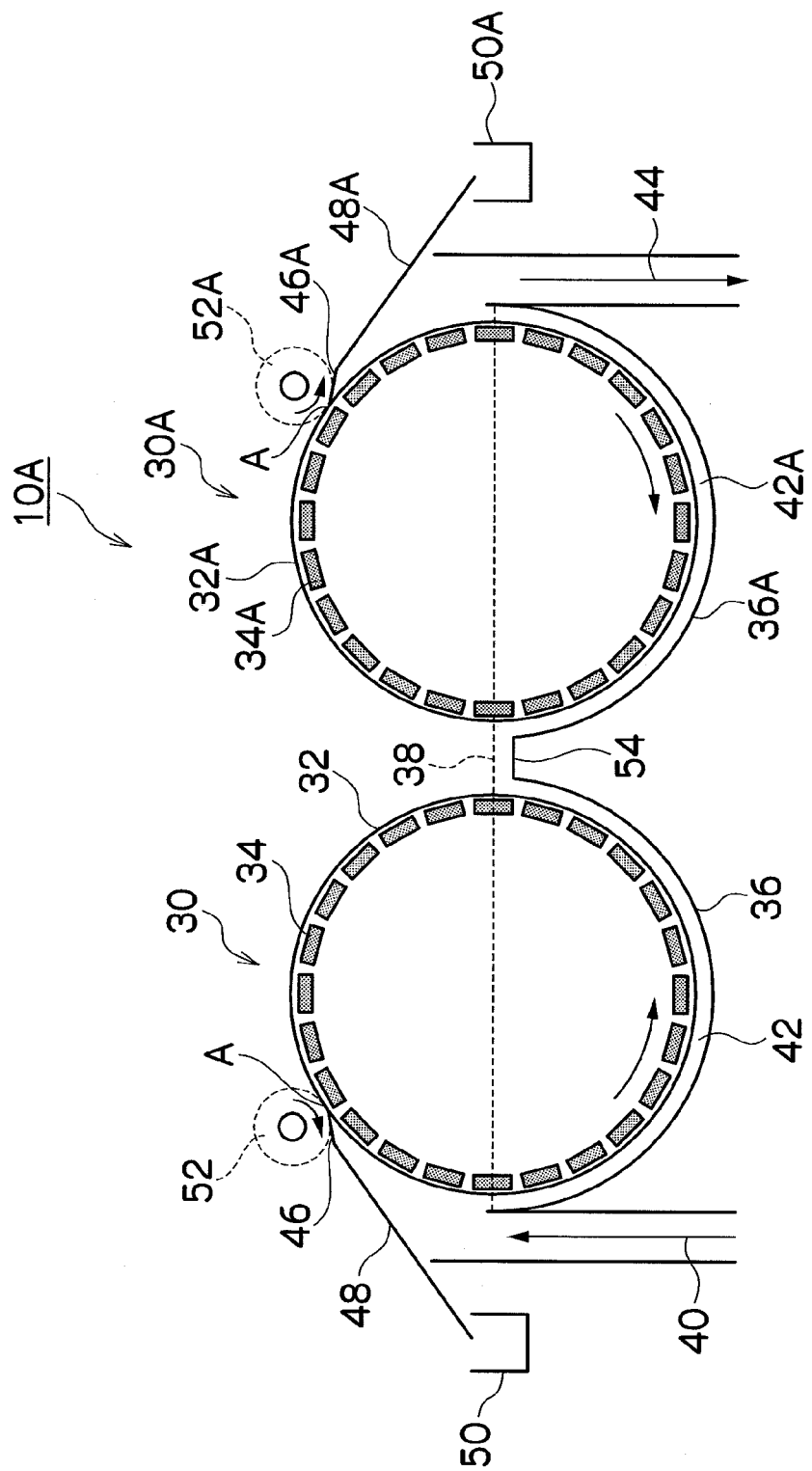
FIG. 3 is a side sectional view of a magnetic separation apparatus of a second embodiment.

FIG. 3 is a side sectional view of a magnetic separation apparatus 10A of a second embodiment.

Figure 4:
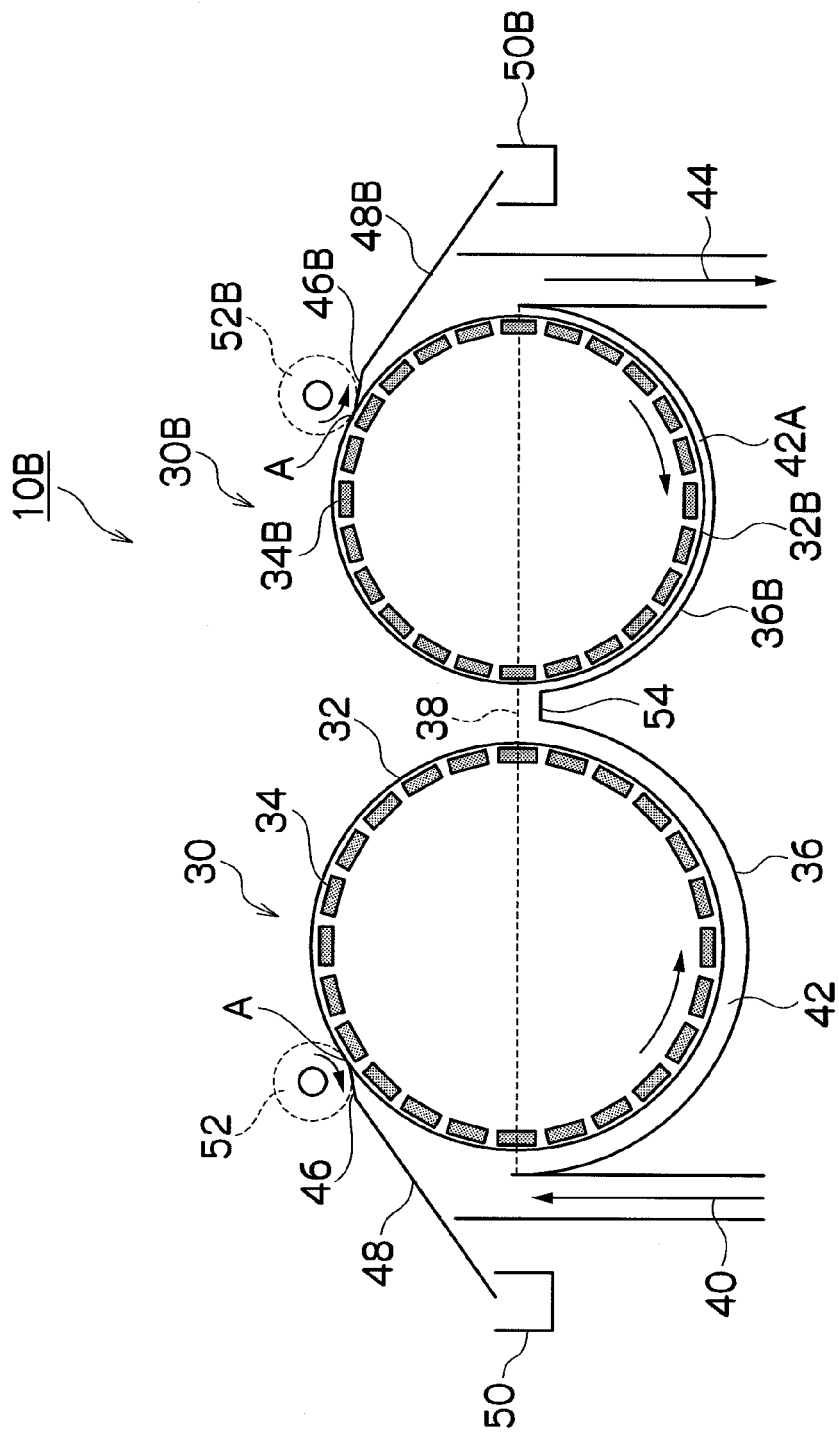
FIG. 4 is a side sectional view of a magnetic separation apparatus of a third embodiment.

FIG. 4 is a side sectional view of a magnetic separation apparatus 10B of a third embodiment.

Figure 5:
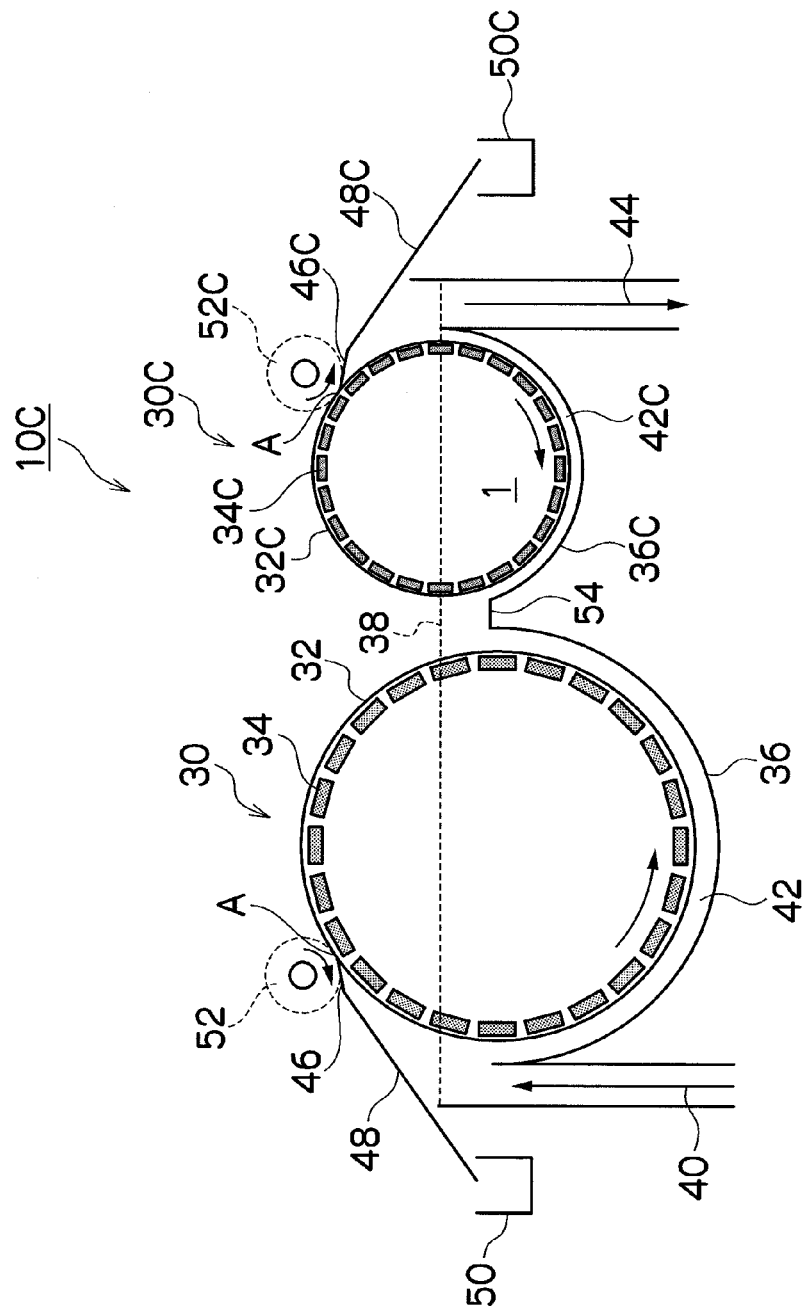
FIG. 5 is a side sectional view of a magnetic separation apparatus of a fourth embodiment.
Figure 6:
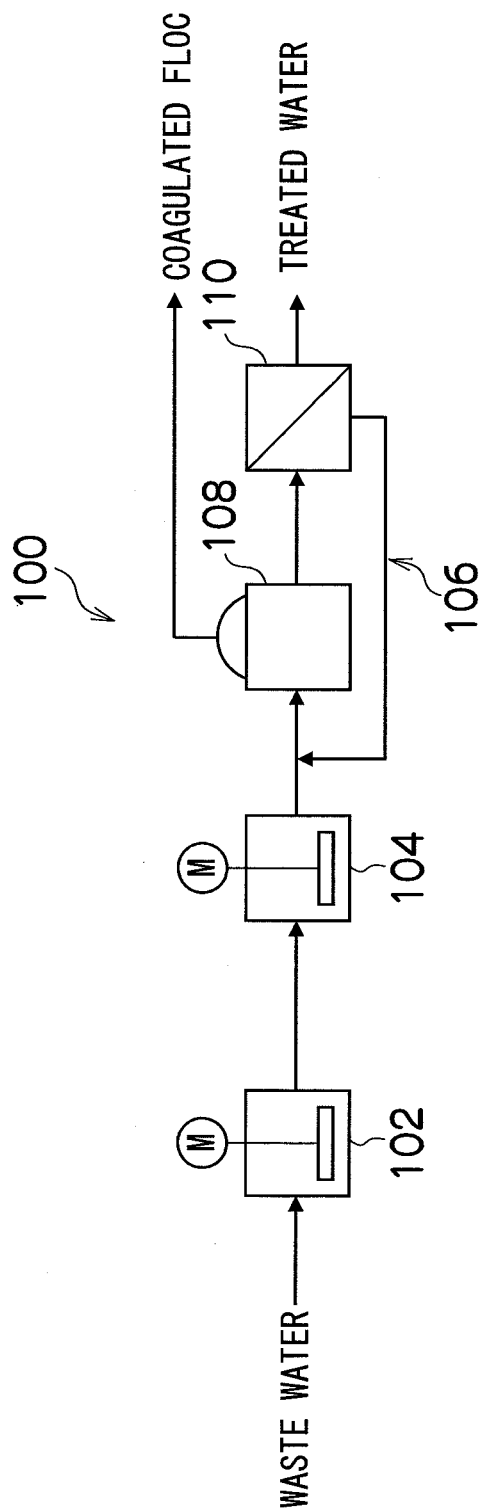
FIG. 6 is a block diagram showing a configuration of a conventional waste water treatment apparatus.
Figure 7:
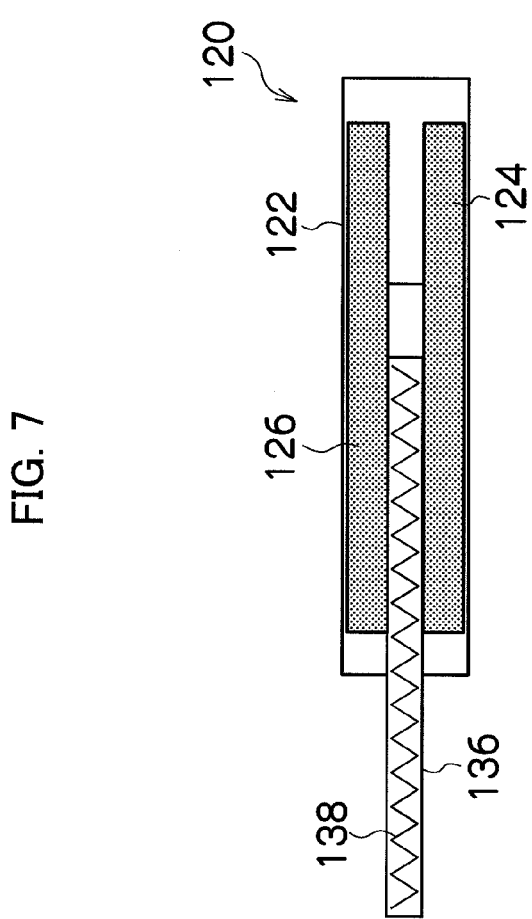
FIG. 7 is a plan view of a conventional magnetic separation apparatus.
Figure 8:
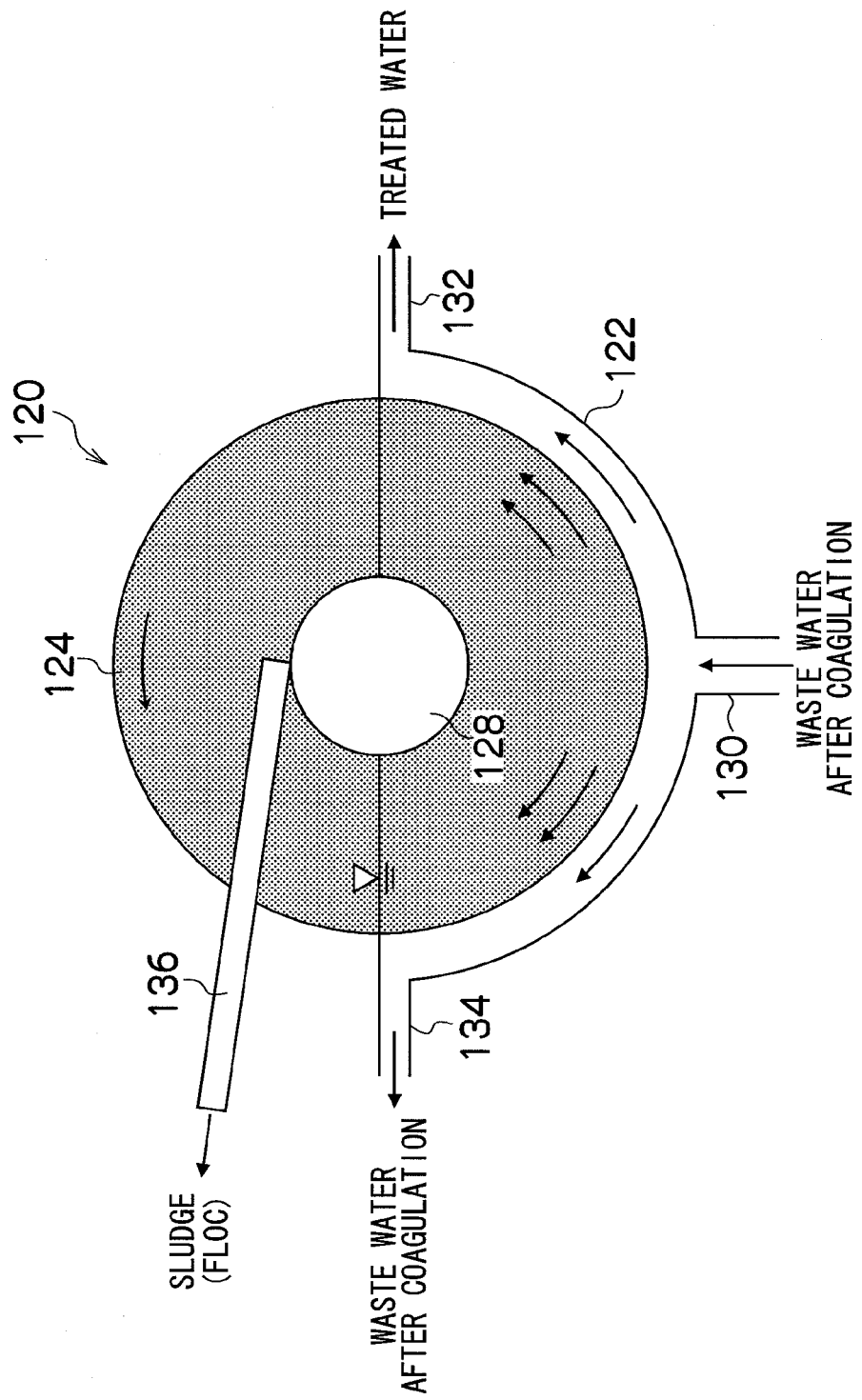
FIG. 8 is a front view of the magnetic separation apparatus shown in FIG. 7.

FIG. 5 is a side sectional view of a magnetic separation apparatus 10C of a fourth embodiment.

For describing the magnetic separation apparatuses 10A, 10B and 10C of the embodiments shown in FIGS. 3 to 5, the same or similar members as those in the magnetic separation apparatus 10 shown in FIG. 2 are denoted by the same reference numerals. Members having the same or similar functions as those in the magnetic separation apparatus 10 are denoted by reference numerals with "A", "B" and "C" at the end, and descriptions thereof will be omitted.

The magnetic separation apparatuses 10A, 10B and 10C shown in FIGS. 3 to 5 have a common configuration in which two separators 30 and 30A, separators 30 and 30B, separators 30 and 30C are placed in series in a flow direction of waste water 38. A rotational direction of the separator 30 on an upstream side is set to be the same as the flow direction of the waste water 38, and a rotational direction of the separators 30A, 30B and 30C on a downstream side is set to be opposite to the flow direction of the waste water 38.

As such, the two separators 30 and 30A, separators 30 and 30B, and separators 30 and 30C are provided in line, thereby reducing a volume of each separator as compared with one separator having the same additional functions. Also, the number of flocs necessarily held by magnets in one separator can be reduced. Further, the number of flocs scraped by the scrapers 46, 46A, 46B and 46C in one separator can be reduced.

Further, in a separation vessel 36 having high concentration on the upstream side, the flow direction of the waste water 38 is the same as the rotational direction of the separator 30, thereby preventing the magnetic floc from being released from the separator 30 due to a difference in relative velocity. In separation vessels 36A, 36B and 36C having low concentration on the downstream side, the waste water 38 contains a reduced number of magnetic flocs. Thus, even with a high relative velocity between a circumferential velocity of the separator 30A and the flow velocity of the waste water 38, the magnetic floc can be collected on the downstream side without difficulty. The rotational direction of the separator 30 is opposite to the rotational direction of the separators 30A, 30B and 30C, thereby providing a compact general configuration of the magnetic separation apparatus 10A. This is because flock collection vessels 50, 50A, 50B and 50C can be placed on opposite sides of the two separators.

Further, a position where the magnetic floc is most likely to be released, that is, a lifting position of the separator 30 is located in an intermediate portion, and thus the released magnetic floc can be easily readsorbed.

The circumferential velocity of the separator 30 on the upstream side may be set to be higher than a circumferential velocity of the separator 30A on the downstream side. The circumferential velocity of the separator 30 on the upstream side is substantially the same as the flow velocity of the waste water 38. In the separator 30A on the downstream side, the magnetic floc contained in the waste water 38 has lower concentration than on the upstream side, and thus rotation can be set to a lower velocity than the flow velocity of the waste water 38. This reduces the relative velocity between the flow velocity of the waste water 38 and the circumferential velocity of the separator 30A, thereby preventing the magnetic floc from being released.

As shown in FIGS. 4 and 5, space in channels 42A, 42B, 42C on the downstream side can be set to be narrower than space in the channel 42 on the upstream side. There are a small number of magnetic flocs on the downstream side, and the magnetic flocs are rarely accumulated to clog the channel 42. Also, the magnetic floc is less likely to be released on the downstream side, thereby allowing quick treatment. Further, the separators 30B and 30C on the downstream side have a low load to adsorb the magnetic floc, and may be made more compact than the separator 30 on the upstream side. Thus, the separators 30B and 30C can be reduced in size to reduce the general size of the magnetic separation apparatuses 10B and 10C.

A height of a weir 54 of a channel connecting the two separators 30 and 30A, separators 30 and 30B, and separators 30 and 30C is set to be lower than a water level (height of a wall of a water channel exit 44). Thus, the flow velocity of the waste water 38 between the separator 30 and the separators 30A, 30B and 30C is lower than the flow velocity of the waste water 38 flowing through the water channel exit 44, thereby preventing the magnetic floc from being released by the flow velocity of the waste water 38 in the lifting position of the separator 30.

An amount of additive may be controlled using water quality data in the channel connecting the two separators 30 and 30A, separators 30 and 30B, and separators 30 and 30C. With the water quality ensured, information on an insufficient amount of additive can be obtained.

The magnetic flock having high concentration collected by the separator 30 on the upstream side may be reused as an agent. Specifically, the magnetic floc having high concentration of magnetic powder can be added to the waste water to reduce an amount of added agent.

In FIGS. 3 to 5, the embodiment in which the two separators are provided in line has been described, but three or more separators may be provided in line.

What is claimed is:

1. A magnetic separation apparatus comprising:
   a separation vessel into which waste water containing a coagulated magnetic floc is supplied;
   a drum separator that is provided in the separation vessel and adsorbs the magnetic floc with a magnetic force while being rotated;
   a scraper that is abutted against a surface of the separator and scrapes the magnetic floc adsorbed by the surface of the separator;
   a scraper guide that is connected to the scraper and discharges the magnetic floc scraped by the scraper; and
   a scraping brush that scrapes the magnetic floc scraped by the scraper from the scraper and guides the magnetic floc to the scraper guide,
   wherein a lower portion of the separator is submerged in the waste water in the separation vessel, a rotational direction of the separator in the waste water is set to the same direction as a flow direction of the waste water flowing in the separation vessel, and a rotational direction of the scraping brush is set to a direction opposite to the rotational direction of the separator.

2. The magnetic separation apparatus according to claim 1, wherein the separation vessel has a semicircular section, the waste water supply portion is provided at one end of opposite ends in an upper portion of the separation vessel, on an upstream side in the rotational direction of the separator, and a treated water discharge portion is provided at the other end of the opposite ends in the upper portion, on a downstream side in the rotational direction of the separator.

3. The magnetic separation apparatus according to claim 1, wherein a maximum circumferential velocity of the separator is set to be substantially the same as a flow velocity of the waste water in the separation vessel.

4. The magnetic separation apparatus according to claim 1, wherein a plurality of separators are placed in series in the flow direction of the waste water, a rotational direction of a separator on an upstream side is set to be the same as the flow direction of the waste water, and a rotational direction of a separator on a downstream side is set to a direction opposite to the flow direction of the waste water.

5. The magnetic separation apparatus according to claim 4, wherein the separator on the downstream side is smaller than the separator on the upstream side.

6. The magnetic separation apparatus according to claim 4, wherein a height of a weir of a channel connecting the separator on the upstream side and the separator on the downstream side is set to be lower than a water level of the waste water.

7. A waste water treatment apparatus comprising:
   a raw water tank that stores waste water;
   a rapid agitation vessel to which the waste water is supplied from the raw water tank and that mixes the waste water, magnetic powder, and an inorganic coagulant;
   a slow agitation vessel to which the waste water mixed by the rapid agitation vessel is supplied and that mixes the waste water and a high molecular coagulant to generate a magnetic floc in the waste water; and
   a magnetic separation apparatus according to claim 1 to which the waste water mixed by the slow agitation vessel is supplied and that separates the magnetic floc in the waste water from the waste water.

* * * * *